Nov. 27, 1928.
E. C. MORGAN
1,693,041
BELT FASTENER FOR CONVEYERS
Original Filed Aug. 11, 1921    2 Sheets-Sheet 1
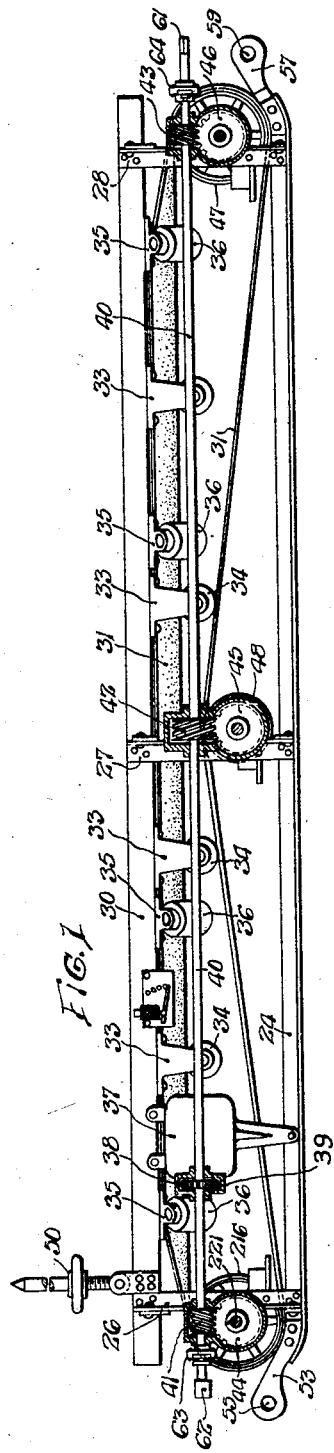
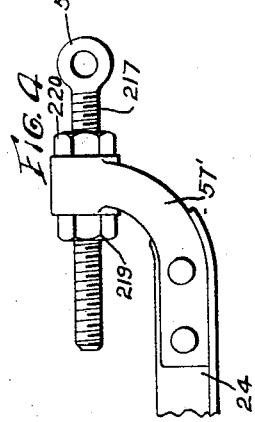
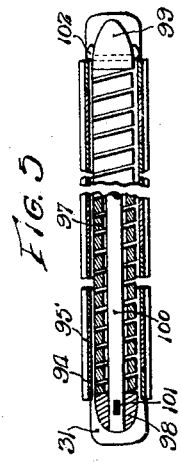
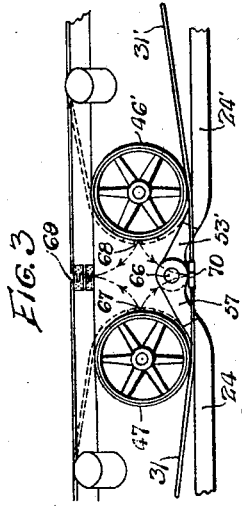
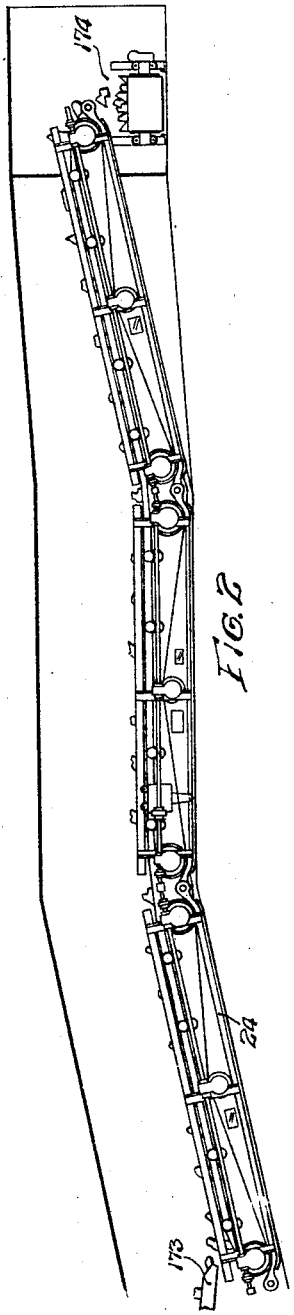
Inventor
Edmund C. Morgan, Deceased.
Olive Eugenie Morgan, executrix
By Nissen & Crane
Attys.

Nov. 27, 1928.
1,693,041
E. C. MORGAN
BELT FASTENER FOR CONVEYERS
Original Filed Aug. 11, 1921    2 Sheets-Sheet 2
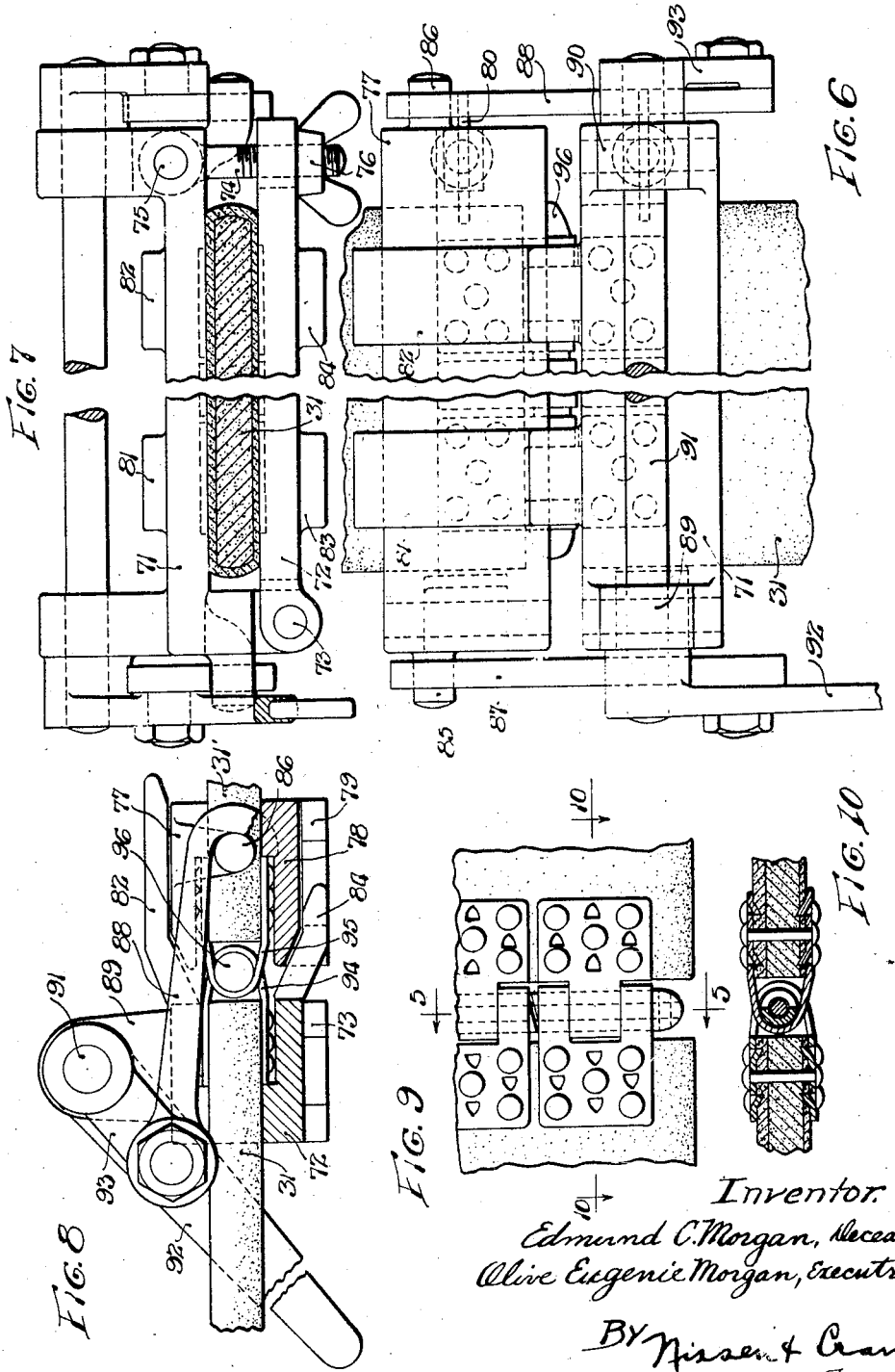
Inventor.
Edmund C. Morgan, Deceased.
Olive Eugenie Morgan, Executrix.
By Nissen & Crane
Attys.

Patented Nov. 27, 1928.

1,693,041

UNITED STATES PATENT OFFICE.

EDMUND C. MORGAN, DECEASED, LATE OF NEW YORK, N. Y., BY OLIVE E. MORGAN, EXECUTRIX, OF NEW YORK, N. Y.

BELT FASTENER FOR CONVEYERS.

Original application filed August 11, 1921, Serial No. 491,474. Divided and this application filed September 16, 1925. Serial No. 56 589.

This invention relates to belt fasteners for conveyers and one of the objects thereof is the provision of a device for efficiently and effectively joining two ends of a belt. The present application is a division of the co-pending application of said Edmund C. Morgan, Serial No. 491,474, filed August 11, 1921, for an improvement in loading and conveying apparatus for coal mines.

More particularly it is the object of the present invention to provide a belt fastener of a flexible nature for joining the ends of a conveyer belt in such a way as to permit the belt to be disposed longitudinally in the form of a trough.

Another object of the invention is the provision of means for holding the ends of the belt in adjacent position while exerting tension on the belt.

A still further object of the invention is the provision of fastening means for joining the ends of a conveyer belt while the belt is disposed around the rollers of the conveyer and without dismantling the latter.

Another object of the invention is the provision of conveyer units, each comprising an endless traveling conveyer belt adapted to be connected to a similar endless conveyer belt of another unit to form a continuous extended traveling conveyer belt of conveyer units connected end to end.

Another object of the invention is the provision of a sectional extensible conveyer comprising a plurality of units, each complete in itself and adapted to be operated separately, but also capable of being connected to other units to form such extensible conveyer with the conveyer of each unit connected to the conveyers of the next adjacent unit to form one continuous conveyer.

A further object of the invention is the provision of sectional conveyer units adapted to be connected end to end to form one continuous conveyer of any desirable length so that the dislodged coal may be received, conveyed and delivered with the formation of a minimum amount of slack.

Another object of the invention is the provision of improved means for connecting the ends of the belts of conveyer units together while permitting the belt to be bent by deflection rollers to form a conveyer trough.

A still further object of the invention is the provision of improved means for clamping the ends of the belt of conveyer units and drawing them together for connection end to end.

Other objects will appear hereinafter, the novel features and combinations being set forth in the appended claims.

Referring to the accompanying drawings:

Fig. 1 is an elevational view of a conveyer unit equipped with an endless traveling belt embodying the invention;

Fig. 2 is an elevational view showing three conveyer units connected together to form one continuous conveyer;

Fig. 3 is a view more or less diagrammatic to show the manner in which the conveyer belt of one unit may be connected to the conveyer belt of the next adjacent unit;

Fig. 4 illustrates a modification of the flexible connection between the ends of the conveyer units;

Fig. 5 is a sectional elevation of a hinge pin embodied in the invention;

Fig. 6 is a plan view of a belt clamping mechanism for bringing together the adjacent ends of the belts of conveyer units;

Fig. 7 is an elevational view of the structure shown in Fig. 6;

Fig. 8 is a side view of the structures shown in Figs. 6 and 7 showing the manner in which the ends of the belts of the adjacent conveyer units are brought together so that the flexible connecting pin of Fig. 5 may be placed in the position illustrated;

Fig. 9 is a plan view of a fragmentary portion of the flexible connection between the conveyer belt of one unit and the conveyer belt of the next adjacent unit; and Fig. 10 is a sectional elevation taken on the line 10, 10 of Fig. 9 looking in the direction of the arrows.

Referring to Fig. 1, 24 designates a longitudinal bar of a pair of angle bars which are adapted to support the framework of the conveyer unit so that the latter may slide over the mine floor. Spaced-apart vertical standards 26, 27 and 28 support the longitudinal angle bar 30 in elevated position, there being a pair of such angle bars 30 disposed in a horizontal plane. The angle bars 30 have secured thereto spaced-apart brackets for carrying rollers in horizontal and inclined positions to support the belt 31 to form a trough to carry the coal 32 as illustrated in Fig. 2. As shown in Fig. 1 the spaced-apart brackets 33 carry the horizontal rollers 34 under the belt 31 while the brackets 35 at both sides of the conveyer carry the individual, short, inclined rollers 36 to deflect the side portions of the belt as shown in Fig. 1.

Between the lower longitudinal angle bar 24 and the upper longitudinal angle bar 30 is secured an electric motor 37 as shown in Fig. 2. This motor is connected by the gearing 38 in the gear casing 39 to the drive shaft 40 which extends from end to end of the conveyer unit as shown in Fig. 1. At the end portions of the drive shaft 40 and intermediate the ends thereof the shaft 40 has secured thereto the worms 41, 42 and 43 which mesh respectively with the worm wheels 44, 45 and 46.

As shown in Fig. 1 the worm wheel 44 is keyed to a transverse shaft 221 mounted in suitable bearings on the framework of the machine. This transverse shaft has mounted thereon and secured thereto a drum or pulley 216 for receiving the belt 31 to drive the latter. If all the driving power were applied to one such drum or pulley the latter would have to be of sufficient diameter to secure the necessary friction to operate the load. It is preferred, however, to reduce the diameters of the driving drums or pulleys so that the conveyer units may be located and operated in low roof mines. The worm wheel 46 is therefore connected to drive the drum or pulley 47 at the other end of the machine and the worm wheel 45 is connected to drive the pulley 48 intermediate the ends of the machine. The belt 31 is therefore in driving connection with both of the end drums 216 and 47 as well as the intermediate drum 48. The power applied to the belt is therefore so distributed that the end pulleys may be reduced in diameter without injuring the belt and the pulley 48 may direct the belt 31 along the upwardly inclined paths as shown in Fig. 1 to secure additional friction as the drums or pulleys 216 are at the same time securing driving connection at the pulley 48.

When the motor 37 operates and the shaft 40 is driven the drums 216, 47 and 48 are simultaneously operated but the ratio of the gearing for each drum may be so proportioned as to secure the same driving speed for each pulley where it contacts with the belt 31, thus equalizing the driving drums or pulleys.

Each conveyer unit may be provided with a pair of roof jacks similar to the roof jack 50 pivoted to the frame-work of the machine as shown in Fig. 1.

Rigidly connected to the rear end of the framework of the machine is a rearwardly extending connecting bar 53, there being a similar connecting bar rigidly connected to each angle bar 24 of the pair of longitudinal bars. These connecting bars are each provided with an eye 55 so that the conveyer unit may be hinged or pivoted on a horizontal axis to a corresponding pair of bars which are respectively connected to the forward end of each angle bar 24 at the forward end of the machine as shown at 57. The bars 57 are offset as shown so that the straight bars 53 of the next adjacent unit will be in proper position to have its eyes 55 register respectively with the eyes 59 of the bars 57 to receive a pivot pin to flexibly connect the unit, as illustrated in Fig. 2.

In Fig. 4 is shown a modification of the flexible connections between the ends of the conveyer units in that the forward ends of the floor angle irons 24 are each provided with upwardly curved brackets 57' having a longitudinal opening at its upper end through which projects a screw-threaded rod 217 provided with an eye 59' at its forward end. By means of the nuts 219 and 220 the degree to which the eye 59' projects beyond the bracket 57' may be adjusted. In this manner connections may be more readily made between the units and when two or more units are connected in series, as shown in Fig. 2, the tension of the belt conveyer may be adjusted by extending or retracting the connections at 59'. It can readily be seen by referring to Fig. 3 that by means of the construction shown in Fig. 4 the angle bars 24 and 24' may be spread apart or brought closer together, thereby regulating the tension or slack in the conveyer belt comprising the sections 31 and 31' which are secured together at 70.

The forward end of the driving shaft 40 of each conveyer unit is squared at 61 to fit into a corresponding socket 62, at the rear end of the next adjacent unit. Also at the end portions of the drive-shaft 40 are flexible couplings 63 and 64, each comprising a flexible element connected between the shaft 40 and the socket 62, as shown in Fig. 1. It will thus be seen that when the units are flexibly connected together mechanically, the drive-shafts 40 are also flexibly connected together so that the power from the motor 37 on one unit may be transmitted along all of the shafts coupled end to end to effect distribution of the power to the conveyer belt on each unit. When the conveyer belts are connected in the manner hereinafter described to form one continuous belt extending along a plurality of conveyer units the power from the motor on one unit will be distributed to three pulleys on each unit, and therefore the power transmitted to the belt will be distributed over a wide area along the entire sectional conveyer.

In Fig. 3 is illustrated the manner of connecting one unit with the next adjacent unit. When the coupling bars 57 and 53', mounted respectively on the frames 24 and 24' are brought together, so that the pivot pin 66 may be inserted, the belts 31 and 31' of adjacent units may be disconnected at 67 and 68, and the ends swung upwardly and downwardly in the direction of the arrows, so that the ends of the belts can be secured together at 69 and 70 to form one continuous belt for the two adjacent sections.

In Figs. 6, 7 and 8 is shown a construction which is particularly adapted to drawing the ends of the belt together so that the flexible pin shown in Fig. 5 may be inserted in position to connect the loops or hinges of the belt ends. The frame 71 shown in Fig. 7 is provided with an arm 72 which is pivoted at 73 to one branch of the frame 71. A bolt 74 is pivoted at 75 to one end of the frame 71. The screw-threaded portion of the bolt 74 extends through an opening in the outer end of the pivoted arm 72 and is adapted to receive a wing nut 76 for clamping the belt 31 securely to the frame 71.

In a similar manner the frame 77 may be provided with a pivoted arm 78 hinged at 79 and operated by the wing nut 80 to clamp the frame 77 to the belt 31'.

It should also be observed that the frame 71 is provided with rearward extensions 81 and 82 to extend over the top of the frame 77 and also remain rigidly connected to the frame 71. The arm 72 is also provided with a pair of rearwardly extending guide arms 83 and 84 to extend under the pivoted arm 78 as shown in Fig. 8.

Extending laterally from the frame 71 are the pins 85 and 86 in position to receive the hooks 87 and 88 respectively. On the frame 71 are the bearing standards 89 and 90 for supporting the rock-shaft 91 to which is connected the operating lever 92. At the other end of the rock-shaft 91 is a lever arm 93 pivoted at its lower end to the hook arm 88. Both the hook arms 87 and 88 are in parallel relation and pivoted respectively to the arms 92 and 93 at equal distances from the rock-shaft 91. The lever arm 92 is free to be moved forward so that the hooks 87 and 88 will reach over the pins 85 and 86 and engage the latter and then when the lever 92 is retracted the belts 31 and 31' may be drawn together so that their hinge loops 94 and 95 may be brought into registry as shown in Fig. 8 whereupon the flexible hinge pin 96 may be inserted to pivotally connect the ends of the belt.

As shown in Fig. 5 the flexible hinge pin for the belt ends comprises a metal coil or spring 97 mounted between the caps 98 and 99 with a rod 100 connecting them. This rod is preferably composed of spring metal or of such material that when made of comparatively small diameter it will bend in conformance with the bending of the conveyer belt, whenever the conveyer belt hinge moves along the angular deflecting rollers 36. The flexible pin is inserted into the hinge loops 94 and 95 from the left, as viewed in Fig. 5, the cross pin 101 being relied upon to limit the position of the pin in said loops. After the pin has been inserted into the loops as shown in Fig. 5, the locking pin 102 is inserted and bent as shown to hold the flexible pin in proper relation to the hinge loops at the ends of the belts while the latter is traveling over a plurality of conveyer units as a single belt made longer by connecting the belts together to act as a single belt.

The hinge pin is preferably provided with a resilient spring 97 having an internal opening or passage to receive the rod 100. This internal opening is of a diameter larger than the diameter of the rod and thus the construction permits free and easy bending of the hinge pin when the belt is deflected by the inclined rollers 36. The space around the rod 100 between the inner surface of the spring 97 is sufficient to prevent binding and excessive frictional wear between these two elements.

The heads 98 and 99 are keyed or pinned onto the ends of the rod 100 as shown at 101 and 102 respectively. These heads are adapted to retain the spring 97 in a compressed state to limit the length thereof. Either one of the pins may be removed to detach one of the heads for the purpose of removing and replacing a worn spring.

The rearwardly extending guides 83 and 84 and the rearward extensions 81 and 82 are provided to direct the adjacent ends of the belt sections so as to bring the hinge loops secured thereto into registration with each other. The fastening device is also adapted to apply sufficient tension on the belt after it is disposed over the rollers, to hold the hinge loops in registration, while the flexible hinge pin is being inserted without reducing the tension in the belt. Thus it is not necessary to remove the conveyer belt member from the rollers in order to draw the ends thereof together for producing the required tension.

The flexible hinge pin is adapted to bend sufficiently to permit the belt to conform to the inclination of the deflection rollers when the joint passes thereover and to straighten out when the joint passes over the horizontal end rollers. Thus the upper portion of the conveyer belt is disposed in the form of an elongated trough while the under portion is substantially flat as shown in Fig. 1.

The sectional conveyer shown in Fig. 1 comprises a plurality of individual conveyer units which are connected together with the conveyer belts thereof joined end to end to provide one long continuous belt. If it is desired to lengthen such a conveyer another unit may be added at the expense of comparatively little labor. One of the joints of the continuous conveyer belt may be unfastened by removing the hinge pin and an end of the belt section of the added unit may be secured to one end of the extended belt conveyer. After the frame of the additional unit has been attached to the frame of the last unit of the series, the belt and clamping means may be attached to the free ends of the extended belt and these ends may then be drawn together while the belt is disposed over the rollers of the extended frame. A flexible hinge pin may then be inserted through the hinge loops and the clamping member may be removed leaving the belt free to travel the path directed by the inclined and horizontal rollers.

Obviously those skilled in the art may make various changes in the details and arrangement of parts without departing from the spirit and scope of the invention as defined by the claims hereto appended, and it is therefore desired not to be restricted to the precise construction herein disclosed.

Having thus fully described and shown an embodiment of the invention what is desired to be secured by Letters Patent of the United States is:

1. In conveyer mechanism, the combination with a belt, of a clamp adapted to engage one end of said belt, an additional clamp for engaging the other end of said belt, pins extending laterally from one of said clamps, and a pair of hooks on the other clamp for engaging the said pins to hold the ends of said belt together while being connected to form an endless belt.

2. A belt fastener comprising clamps adapted to be secured one on each end of a belt, an upright bracket on one of said clamps, an operating lever pivoted on the upper end of said bracket, a connecting lever pivoted to said operating lever intermediate the ends thereof, a hook on the free end of said connecting lever, and a pin on the other clamp adapted to be engaged by said hook to draw said clamps together when said operating lever is pressed downwardly.

3. A belt fastener comprising two clamping members, means for securing said clamping members to adjacent ends of a belt, a pin projecting from each side of one of said clamping members, and a hook pivotally mounted on each side of the other clamping member in registration with said pins, said hooks being adapted to engage said pins after the clamping members are secured to said belt ends and to draw the latter together.

OLIVE E. MORGAN,

*Executrix of the Estate of Edmund C. Morgan, Deceased.*